United States Patent Office 3,257,367
Patented June 21, 1966

3,257,367
POLYMERS OF BRANCHED CHAIN MONO-OLEFINIC HYDROCARBONS
Alfred Coles Haven, Jr., Hancock's Bridge, N.J., assignor to E. I. du Pont de Nemours and Company, Wilmington, Del., a corporation of Delaware
No Drawing. Filed June 23, 1955, Ser. No. 517,639
17 Claims. (Cl. 260—93.7)

This invention relates to new chemical compounds, and more particularly to crystalline, orientable polymers or branched chain aliphatic mono-olefines.

In an article by Giulio Natta in the J. Am. Chem. Soc., vol. 77, March 20, 1955, pages 1708–1710, mention is made of the fact that prior to the work of the author no crystalline polymers of olefinic hydrocarbons containing asymmetrical carbon atoms in the principal chain of macromolecules have been reported. By use of a special catalyst not described, the author was able to obtain crystalline polymers of propylene and butene-1. From the melting points of the products reported, one concludes, as would be expected, that, as the lateral aliphatic chain lengthens, the melting point decreases.

In a recently issued Belgian Patent 530,617 of July 23, 1954, various aliphatic mono-olefines have been polymerized with a new type of catalyst to produce, in general, relatively low molecular weight compounds which are gummy, oily or waxy products. Using the particular catalyst employed in this patent, 4-methyl-1-pentene, for instance, was polymerized to produce a solid polymer which is described on page 43 as an appropriate replacement for natural waxes.

It is an object of the present invention to prepare new crystalline, orientable polymers from branched mono-olefinic hydrocarbons containing from 5 to 9 carbon atoms. It is a further object to prepare new crystalline hydrocarbon polymers which are capable of being shaped into useful fibers, bristles, films, tubes, rods and other articles.

In the preparation of the new polymers of this invention, branched chain terminal mono-olefinic hydrocarbons are polymerized at relatively low temperatures and pressures with catalysts which are now known as coordination catalysts, particularly those prepared by the reduction of titanium tetrachloride or vanadium tetrachloride with lithium aluminum tetraalkyl (such as lithium aluminum tetrabutyl or tetradecyl), or with other organo-metallic reducing agents. In this reduction the valence of the titanium or vanadium is reduced from 4 to, at least in part, below 3.

These catalysts, as distinguished from the previously known polymerization catalysts, effect polymerization of the branched chain terminal mono-olefinic hydrocarbons of the structure $CH_2=CH-R$, in which R represents a branched chain, saturated hydrocarbon radical of from 3 to 7 carbon atoms, including cycloaliphatic radicals, in which branching of the chain takes place on a carbon atom not more than two removed from the vinyl radical and the longest straight chain in the molecule does not exceed 7 carbon atoms, to produce crystalline, orientable, fiber-forming polymers which, with the exception of poly-(3 - methyl-1-butene), poly(3,3-dimethyl-1-butene) and poly(4,4-dimethyl-1-pentene), have an inherent viscosity of above 1 when measured as a 0.1% solution in decahydronaphthalene at 130° C., and a crystalline melting point of above 150° C. In the preparation of films and fibers, a melting point above 200° C. is preferred.

The polymers of this invention have a crystallinity in excess of 20% as measured by X-ray diffraction methods, and when oriented they ordinarily exhibit a crystallinity in excess of 70%.

It is generally recognized in the polymer art that the introduction of side chains to the main polymer chain lowers the physical properties, particularly the thermal properties such as the melting point and softening temperature of the polymer. In the compounds of the present invention, it has been found that, by introducing a branched side chain on to the main polymer chain, the melting point and general thermal properties of the polymers are in fact raised.

The branched chain terminal mono-olefinic hydrocarbons employed in the preparation of the polymers of this invention coming within the formula above given include the cycloaliphatic as well as the open chain aliphatic compounds, such as isopropyl ethylene, isobutyl ethylene, secondary butyl ethylene, neopentyl ethylene, 3-ethyl-1-pentene, 4-ethyl-1-heptene, vinyl cyclopropane, vinyl cyclobutane, vinyl cyclopentane, vinyl cyclohexane, allyl cyclopropane, allyl cyclobutane, allyl cyclopentane, allyl cyclohexane, 4-methyl-1-hexene and 4-ethyl-1-hexene.

The polymerization of these hydrocarbons is carried out in an inert organic solvent, preferably the same solvent in which the catalyst is produced. Any of the inert solvents such as benzene, xylene, chlorobenzene, tetrahydronaphthalene, decahydronaphthalene, cyclohexane, tetrachloroethylene, may be used. The polymerization may ordinarily be carried out at atmospheric temperatures and pressures. Since the reactants are liquids, the polymerization may be carried out in open vessels, provided that water and oxygen are rigorously excluded. Higher or lower temperatures or pressures may of course be used, if desired. It will be obvious that the reaction may be carried out by the usual batch method or in a continuous process.

Catalysts may be readily produced by reacting lithium aluminum hydride with 1-decene or other olefine such as 1-butene, 1-tetradecene, 1-octadecene, etc., in tetrahydronaphthalene or other solvent at 130° to 180° C., to which solution the titanium tetrachloride is added with stirring at room temperature. The reaction with the titanium tetrachloride is preferably carried out in an inert atmosphere, such as nitrogen, to prevent deactivation of the resulting catalyst.

The following examples are given to illustrate the invention, in which parts are by weight unless otherwise specified.

*Example 1*

Twenty ml. of neopentylethylene, made according to the literature from t-butyl magnesium chloride and allyl chloride, was added to a catalyst suspension prepared from 50 ml. of lithium aluminum tetradecyl (0.20 M in tetrahydronaphthalene) and 9 ml. of titanium tetrachloride (1.08 M in cyclohexane). The polymerization was allowed to proceed for 24 hours when it was quenched with propanol. The white powdery polymer was filtered off, washed free of catalysts with more alcohol and dried. The yield was 2.6 g. This polymer was pressed into a film which was annealed at 200° C. to bring about crystallization. The clear, stiff film so prepared had a crystalline melting point over 350° C. and a crystallinity in excess of 20% as measured by X-ray diffraction methods.

*Example 2*

A suspension of 0.8 g. of lithium aluminum hydride in 21 ml. of dry decene-1 was heated under dry nitrogen in a dry 1 liter flask with agitation at 145° to 150° C. for two hours. Dry benzene (300 ml.) was then added and the suspension cooled to 25° C. With vigorous agitation, 10 ml. of a 20% (w./v.) solution of titanium tetrachloride in benzene was added. To the resulting black suspension, 100 ml. of neopentylethylene (4,4-dimethylpentene-1) was added. The reaction mixture was warmed to about 30° C. and allowed to stir for two days at room temperature in an atmosphere of dry nitrogen. It was then poured into 500 ml. of methanol and the precipitated solid separated by filtration. The solid (25 grams), which is poly(neopentylethylene), was washed and air dried. It was substantially insoluble in boiling tetrahydrofuran, chloroform and benzene. A very dilute solution in xylene could be prepared by prolonged extraction of the polymer in a Soxhlet apparatus. The polymer was highly crystalline by X-ray diffraction. It had a crystalline melting point of over 300° C. (as determined by disappearance of birefringence using crossed "Polaroid" filters), and could be pressed into films at 250° C. and 10,000 p.s.i. The somewhat lower melting point of the product of this example, as compared to the product of Example 1, is apparently due to the small excess of the decene-1 used in the preparation of the catalyst.

*Example 3*

A catalyst suspension was prepared by mixing 500 ml. of cyclohexane, 200 ml. of lithium aluminum tetradecyl (0.20 M) and 31 ml. of titanium tetrachloride (1.08 M). Two hundred ml. of isobutylethylene was then added all at once. Polymerization was mildly exothermic and after 24 hours the entire mixture had set to a nearly solid mass. The polymer was isolated by agitating with alcohol in a Waring blender, followed by filtration. The solid polymer was washed several times with alcohol and dried. The yield was 85 g. of polymer with an inherent viscosity of 4.25 as determined on a 0.1% solution in decahydronaphthalene.

The poly(isobutylethylene) thus obtained could be melt extruded at 250° C. to filaments which could be wound up. Fibers prepared in this manner could be drawn 5× at 170° C. These filaments were boiled off in a taut condition at 100° C. for one-half hour. The following physical properties were observed on these filaments: Tenacity—2.3 g.p.d., elongation—24%, modulus—27, denier—67. The fibers were highly crystalline, showing a crystallinity in excess of 50%, and oriented, showing a crystalline melting point of 235° C. and a fiber sticking temperature of 203° C. Shrinkage on relaxed boil-off at 100° C. was less than 5%.

*Example 4*

A catalyst suspension was prepared in the manner described in Example 3, from 200 ml. of cyclohexane, 50 ml. of lithium aluminum tetradecyl (0.20 M) and 7.8 ml. of titanium tetrachloride (1.08 M). Forty ml. of 4-methylhexene-1 was then added to the suspension. Polymerization was allowed to proceed for 20 hours and the polymer was isolated as in Example 3. The yield was 11.6 g. of a hard, non-tacky, non-rubbery polymer similar in appearance to polyethylene. It had an inherent viscosity of 2.72 as determined on a 0.1% solution in decahydronaphthalene at 130° C. Films were pressed at 200° C. and drawn 4× at 140° C. The drawn film was very highly crystalline (showing a crystallinity in excess of 30%) and oriented as shown by X-ray diagrams. High modulus fibers were obtained by extruding the polymer from a melt spinning apparatus at 200° C. The highly crystalline, oriented polymer showed a crystalline melting point of about 160° C.

*Example 5*

A catalyst suspension was prepared as described in Example 3, from 150 ml. of cyclohexane, 50 ml. of lithium aluminum tetradecyl (0.20 M) and 8 ml. of titanium tetrachloride (1.08 M). Twenty ml. of 3-cyclopentylpropene-1 was added and polymerization was allowed to proceed for about 60 hours. The polymer was then isolated in the usual way, as a hard, non-rubbery powder. It weighed 13 g. and had inherent viscosity of 1.75 as measured on a 0.1% solution in decahydronaphthalene at 130° C. The polymer could be pressed into clear, tough film at 225° C. which could be drawn 3× at 140° C. X-ray diagrams showed that the drawn film strips were highly crystalline and oriented. The melting point of the crystalline polymer was 225° C. as observed on a polarizing microscope on a hot stage. The polymer could be spun quite easily at 250° C. to fibers which could be drawn 3× and wound up in the usual manner.

*Example 6*

A catalyst suspension was prepared by mixing 100 ml. of 0.20 molar lithium aluminum tetradecyl in tetrahydronaphthalene, 18 ml. of 1.08 molar titanium tetrachloride solution in cyclohexane and 500 ml. of cyclohexane with rapid stirring under nitrogen. 100 ml. of allyl cyclohexane (boiling point 151° C.) was then added to the suspension. After 24 hours, the reaction mixture had set to a thick, viscous solution. The polymer was precipitated with isopropanol, filtered, washed with isopropanol, redissolved in cyclohexane, filtered in a pressure filtration apparatus, and reprecipitated with isopropanol.

The yield of polymer after drying was 33 grams. The inherent viscosity was 1.32 as measured on a 0.1% solution in decahydronaphthalene at 130° C. The polymer was easily soluble in cyclohexane, chloroform, methylene chloride and other similar solvents. Solutions of the polymer could be dry spun into fibers. The polymer could be pressed into clear, tough film at 175° C. and 10,000 pounds pressure. Films and fibers could be drawn and oriented to highly crystalline structures. The oriented films and fibers showed a crystalline melting point of about 225° C.

*Example 7*

To 0.05 mol of catalyst suspension prepared as described in Example 6, was added 63 grams of isopropylethylene. The mixture was allowed to polymerize for 24 hours and the polymer was isolated by precipitation and washing repeatedly with isopropyl alcohol. The fine white polymer powder weighed 14 grams and could be pressed into clear, tough film and melt extruded at 310° C. to fibers which could be very highly oriented by drawing. The highly crystalline (in excess of 50%), oriented polymer showed a crystalline melting point of about 270° C. The polymer is insoluble in decahydronaphthalene at 130° C. and is insoluble in cyclohexane, chloroform, benzene and acetone at the boiling point of these solvents.

*Example 8*

A suspension of 0.9 g. of lithium aluminum hydride in 20 ml. of dry decene-1 was heated under dry nitrogen in a 1 liter flask with agitation at from 150° to 160° C. for two hours. The suspension was diluted with 500 ml. of dry benzene, cooled to 25° C. and 10 ml. of a 20% (w./v.) solution of titanium tetrachloride in benzene was added. To the resulting black suspension was added 100 ml. of isopropylethylene (3-methylbutene-1). The reaction mixture was agitated at 25° to 30° C. (occasional cooling was required). After eighteen hours the reaction mass was poured into 1 liter of methanol and the precipitated solids boiled with methanol until color-free. The yield of poly(isopropylethylene) was 16.3 g. This polymer is highly crystalline by X-ray determination. Threads can be drawn from a melt, and clear, tough films could be pressed at 250° C. and 10,000 p.s.i. The poly(isopropylethylene) could be extruded at 310° C. to a very stiff fiber which could be crystallized and oriented. The crystalline melting point, determined on this fiber sample, was 245° C.

*Example 9*

To .002 mol of a catalyst prepared as in Example 6, was added 22 grams of 4,4-dimethylhexene-1. After 24 hours, the polymer was isolated in the usual way, washed with isopropanol several times, then with ether and dried. The polymer had an inherent viscosity of 1.12 as measured on a 0.1% solution in decahydronaphthalene at 130° C. The polymer could be pressed into clear film at 200° C. and 10,000 pounds pressure. The film was highly crystalline and showed a crystalline melting point above 350° C.

It should be recognized that the crystalline melting point of the polymeric substances, such as those described in the above examples, cannot be determined with the accuracy that the melting point of pure monomeric crystalline products can be determined, and therefore the crystalline melting points given in the examples if not precise, are within 10° C. of the absolute value. In those cases where melting points are given as above 350° C., the actual melting point in those examples was not determined because the apparatus employed would not give melting points above that figure. The products, however, still showed crystallinity at 350° C., as shown by observance of strong birefringence in a polarizing microscope equipped with a hot stage. In general, the products of this invention show relatively high crystallinity as determined by examination of the X-ray patterns. The values given in the examples are minimum values, and absolute values will in most cases be found to be much higher.

What is claimed is:

1. A crystalline, orientable, fiber forming polymer of a member of the group consisting of 3-methyl-1-pentene, vinyl cyclopropane, vinyl cyclobutane, allyl cyclopropane, 4-methyl-1-hexene, 3-ethyl-1-pentene, allyl cyclobutane, vinyl cyclopentane and branched chain mono-olefines of the formula $CH_2=CH-R$, in which R represents a branched chain saturated hydrocarbon radical of from 6 to 7 carbon atoms in which branching of the chain takes place on a carbon atom not more than two removed from the vinyl radical and the longest straight chain in the molecule does not exceed 7 carbon atoms, said polymer having an inherent viscosity of above 1 when measured as a 0.1% solution in decahydronaphthalene at 130° C. and a crystalline melting point of above 150° C.

2. A normally solid, crystalline polymer of 4,4-dimethyl-1-pentene having a crystalline melting point of above 300° C. and being insoluble in decahydronaphthalene at 130° C.

3. A normally solid, crystalline, orientable polymer of 4-methyl-hexene-1 having an inherent viscosity above 1 when measured as a 0.1% solution in decahydronaphthalene at 130° C. and a crystalline melting point of above 150° C.

4. A normally solid, crystalline, orientable polymer of allyl cyclohexane having an inherent viscosity above 1 when measured as a 0.1% solution in decahydronaphthalene at 130° C. and a crystalline melting point of above 200° C.

5. An oriented polymer of claim 1 in the form of a film.

6. A crystalline, orientable polymer of claim 1 in the form of a film.

7. Oriented fibers and films of the polymer of claim 13.

8. A crystalline orientable polymer of claim 1 in the form of a fiber.

9. An oriented polymer of claim 1 in the form of a fiber.

10. The product of claim 8 in which the crystalline melting point is above 200° C.

11. The product of claim 9 in which the crystalline melting point is above 200° C.

12. A normally solid, crystalline, orientable polymer of allyl cyclopentane having an inherent viscosity above 1 when measured as a 0.1% solution in decahydronaphthalene at 130° C. and a crystalline melting point of above 200° C.

13. Substantially crystalline poly-3-methyl-1-butene which is solid at room temperature.

14. A solid, crystalline homopolymer of 3-cyclopentyl-1-propene having a softening point above 180° C.

15. A solid, crystalline homopolymer of 3-cyclohexyl-1-propene having a softening point above 190° C.

16. Orientable fibers and films of the polymer of claim 13.

17. A stretched oriented fiber formed from poly(4-methyl-1-pentene) having a crystallinity of at least 50 percent, said fiber being characterized by an ultimate elongation at break of at least 15 percent, a melting point of about 235° C. to about 240° C., and a tensile strength of at least 1.5 g.p.d.

References Cited by the Examiner

UNITED STATES PATENTS

| 2,728,757 | 12/1955 | Field et al. | 260—93.7 |
| 2,825,721 | 3/1958 | Hogan et al. | 260—94.9 |
| 2,842,532 | 7/1958 | Campbell | 260—94.9 |

FOREIGN PATENTS

| 530,617 | 1/1955 | Belgium. |

OTHER REFERENCES

A French-English Dictionary for Chemists, Patterson, 2nd edition (1954), John Wiley & Sons, New York, copy in Patent Office Library, page 433.

Natta et al.: J. Am. Chem. Soc. 77, 1708–1710 (Mar. 20, 1955, received Jan. 31, 1955). Copy in library.

JOSEPH L. SCHOFER, *Primary Examiner.*

W. G. BENGEL, A. M. BOETTCHER, B. E. LANHAM, J. FROME, L. H. GASTON, *Examiners.*